United States Patent
Rosenberg et al.

(10) Patent No.: US 9,489,999 B2
(45) Date of Patent: Nov. 8, 2016

(54) MAGNETIC TUNNEL JUNCTION RESISTANCE COMPARISON BASED PHYSICAL UNCLONABLE FUNCTION

(71) Applicant: QUALCOMM Incorporated, San Diego, CA (US)

(72) Inventors: Brian Marc Rosenberg, San Diego, CA (US); Xiaochun Zhu, San Diego, CA (US); Xu Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 14/555,434

(22) Filed: Nov. 26, 2014

(65) Prior Publication Data

US 2016/0148666 A1 May 26, 2016

(51) Int. Cl.
| | |
|---|---|
| *G11C 11/00* | (2006.01) |
| *G11C 11/16* | (2006.01) |
| *G09C 1/00* | (2006.01) |
| *H04L 9/08* | (2006.01) |
| *H04L 9/32* | (2006.01) |
| *G11C 16/20* | (2006.01) |

(52) U.S. Cl.
CPC ............ *G11C 11/1673* (2013.01); *G09C 1/00* (2013.01); *G11C 11/1675* (2013.01); *G11C 11/1695* (2013.01); *H04L 9/0866* (2013.01); *H04L 9/3278* (2013.01); *G11C 16/20* (2013.01)

(58) Field of Classification Search
CPC ................................ G11C 11/16; G11C 11/15

USPC ..................................... 365/158, 171, 173
See application file for complete search history.

(56) References Cited

U.S. PATENT DOCUMENTS

| | | | |
|---|---|---|---|
| 6,597,598 B1 | 7/2003 | Tran et al. | |
| 7,286,431 B2* | 10/2007 | Hidaka | ............... G11C 29/846 365/158 |
| 7,577,020 B2 | 8/2009 | Chung et al. | |
| 2013/0073598 A1 | 3/2013 | Jacobson et al. | |
| 2014/0071740 A1 | 3/2014 | Kim et al. | |
| 2015/0071432 A1* | 3/2015 | Zhu | ..................... G11C 11/1673 380/28 |

OTHER PUBLICATIONS

Zhang L., et al., "Highly Reliable Memory-based Physical Unclonable Function Using Spin-Transfer Torque MRAM," IEEE International Symposium on Circuits and Systems (ISCAS), 2014, pp. 2169-2172.
International Search Report and Written Opinion—PCT/US2015/059069—ISA/EPO—Feb. 5, 2016.
Kavehei O., et al., "mrPUF: A Memristive Device Based Physical Unclonable Function", Retrieved from the Internet: URL:http://arxiv.org/ftp/arxiv/papers/1302/1302.2191.pdf [retrieved on Jan. 26, 2016].

* cited by examiner

*Primary Examiner* — Huan Hoang
(74) *Attorney, Agent, or Firm* — Toler Law Group, PC (57) ABSTRACT

A method includes coupling a first magnetic tunnel junction (MTJ) element and a second MTJ element to a comparison circuit. The method also includes comparing, at the comparison circuit, a first resistance of the first MTJ element to a second resistance of the second MTJ element. The method further includes generating a first physical unclonable function (PUF) output bit based on a result of comparing the first resistance to the second resistance.

30 Claims, 5 Drawing Sheets

MAGNETIC TUNNEL JUNCTION RESISTANCE COMPARISON BASED PHYSICAL UNCLONABLE FUNCTION

I. FIELD

The present disclosure is generally related to a physical unclonable function.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Electronic devices, such as wireless telephones, may include a magnetic random access memory (MRAM) (e.g., a high-density non-volatile storage memory) to store data. The MRAM may include magnetic tunnel junction (MTJ) elements that may be programmed to a parallel state (representative of a logical "0" data value) or to an anti-parallel state (representative of a logical "1" data value). As used herein, a parallel state corresponds to when a polarization of a reference layer of an MTJ element and a polarization of a free layer of the MTJ element have a similar orientation, and an anti-parallel state corresponds to when the polarization of the reference layer and the polarization of the free layer have opposite orientations. An MTJ element may have a relatively low resistance (e.g., approximately between 2000 ohms and 4000 ohms) in the parallel state, and an MTJ element may have a relatively high resistance (e.g., approximately between 4000 ohms and 8000 ohms) in the anti-parallel state. The resistance variations for MTJ elements having the same state may be based on a manufacturing process (e.g., physical size and chemical composition).

The resistance variations may be used for physical unclonable functions (PUFs). For example, devices (e.g., MRAMs) may be identified using PUFs. One bit of a PUF output may be generated by comparing the resistance of two adjacent MTJ elements. For example, the bit may be a "0" bit if a first MTJ element has a greater resistance than a second MTJ element, and the bit may be a "1" bit if the second MTJ element has a greater resistance that the first MTJ element. A limited number of bits of the PUF output may be generated when comparisons are limited to adjacent MTJ elements.

III. SUMMARY

Systems, methods, and techniques are disclosed for generating physical unclonable function (PUF) output bits based on magnetic tunnel junction (MTJ) resistances. A magnetic random access memory (MRAM) device may include a comparison circuit, and at least one selection circuit (e.g., one or more multiplexers). A plurality of MTJ elements (e.g., non-adjacent MTJ elements programmed to a similar state) may be coupled to the inputs of the one or more selection circuits.

As an example, a first selection circuit may couple a first MTJ element of the plurality of MTJ elements to the comparison circuit based on a selection signal, and a second selection circuit may couple a non-adjacent MTJ element to the comparison circuit based on another selection signal. The comparison circuit may compare a resistance of the first MTJ element to a resistance of the non-adjacent MTJ element and generate a PUF output bit based on the comparison. For example, the comparison circuit may detect which MTJ element has a greater voltage potential (e.g., a greater resistance). If the first MTJ element has the greater voltage potential, the comparison circuit may generate a logical "0" data value as the PUF output bit. If the non-adjacent MTJ element has the greater voltage potential, the comparison circuit may generate a logical "1" data value as the PUF output bit. The PUF output bit may be used as a product identifier to uniquely identify a product (e.g. a chip or the MRAM device) based on manufacturing process variations that cause a resistance variation in the first MTJ element and the non-adjacent MTJ element (when the MTJ elements are programmed to a similar state).

In a particular aspect, a method includes coupling a first magnetic tunnel junction (MTJ) element and a second MTJ element to a comparison circuit. The method also includes comparing, at the comparison circuit, a first resistance of the first MTJ element to a second resistance of the second MTJ element. The method further includes generating a first physical unclonable function (PUF) output bit based on a result of comparing the first resistance to the second resistance.

In another particular aspect, an apparatus includes a first selection circuit having a first input coupled to a first magnetic tunnel junction (MTJ) element and having a second input coupled to a second MTJ element. The apparatus also includes a selection circuit having a first input coupled to the first MTJ element and having a second input coupled to the second MTJ element. The apparatus further includes a comparison circuit configured to compare a first resistance of the first MTJ element to a second resistance of the second MTJ element. The first MTJ element is coupled to the comparison circuit via one of the first selection circuit or the second selection circuit. The second MTJ element is coupled to the comparison circuit via the other of the first selection circuit or the second selection circuit. The comparison circuit is also configured to generate a first physical unclonable function (PUF) output bit based on a result of comparing the first resistance to the second resistance.

In another particular aspect, a non-transitory computer-readable medium includes instructions that, when executed by a processor, cause the processor to couple a first magnetic tunnel junction (MTJ) element and a second MTJ element to a comparison circuit. The instructions are also executable to cause the processor to compare, at the comparison circuit, a first resistance of the first MTJ element to a second resistance of the MTJ element. The instructions are further executable to cause the processor to generate a first physical unclonable function (PUF) output bit based on a result of comparing the first resistance to the second resistance.

In another particular aspect, an apparatus includes means for selecting having a first input coupled to a first magnetic tunnel junction (MTJ) element and having a second input coupled to a second MTJ element. The apparatus also includes means for comparing a first resistance of the first MTJ element to a second resistance of the second MTJ element and for generating a first physical unclonable function (PUF) output bit based on a result of comparing the first resistance to the second resistance.

One particular advantage provided by at least one of the disclosed aspects is an ability to generate physical unclonable function (PUF) output bits by comparing "non-adjacent" magnetic tunnel junction (MTJ) elements. Thus, more PUF output bits may be generated (compared to a magnetic random access memory (MRAM) architecture that only compares adjacent MTJ elements) using the same number of MTJ elements. Other aspects, advantages, and features of the present disclosure will become apparent after review of the entire application, including the following sections: Brief Description of the Drawings, Detailed Description, and the Claims.

V. DETAILED DESCRIPTION

Figure 1:
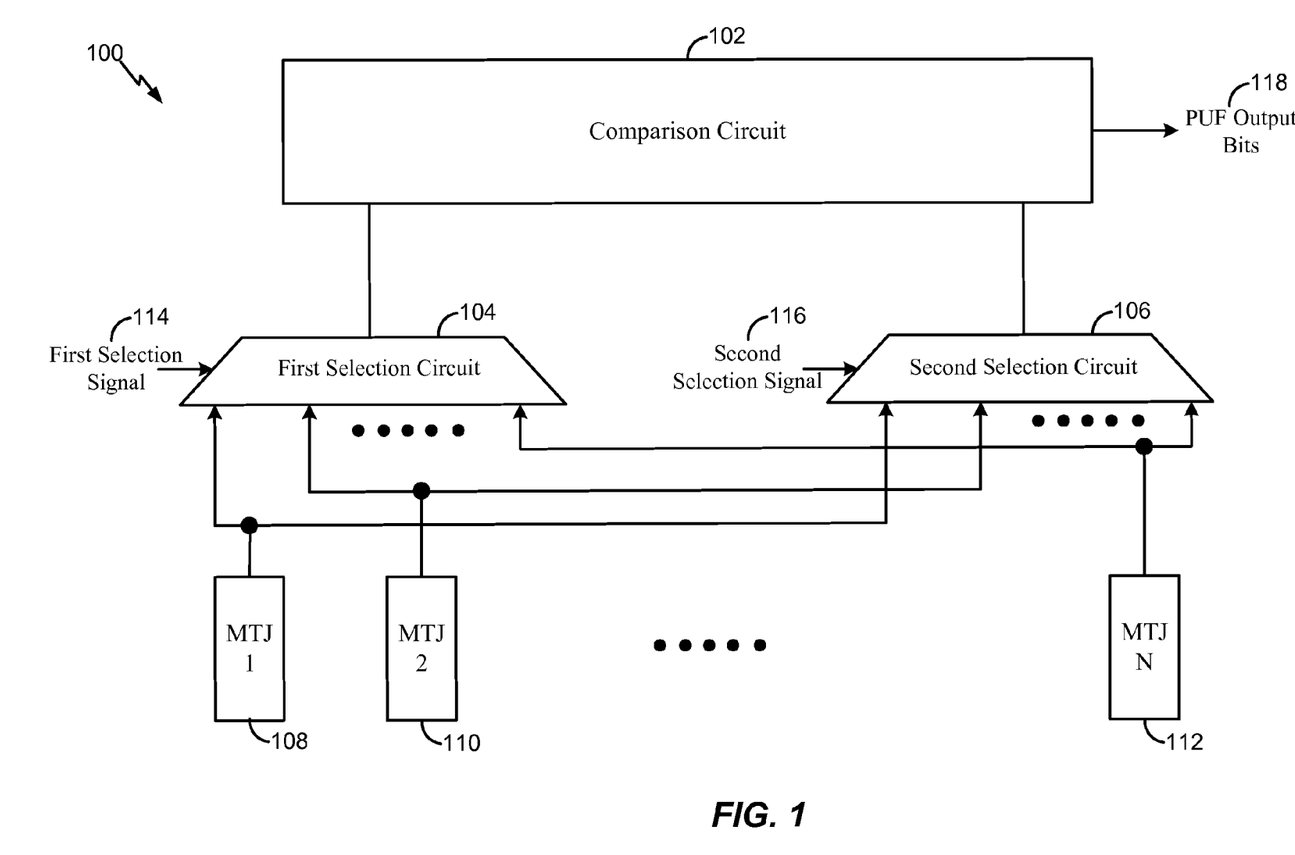
FIG. 1 is a diagram of a particular illustrative aspect of a system that is operable to generate physical unclonable function (PUF) output bits based on magnetic tunnel junction (MTJ) resistances.

Referring to FIG. 1, a particular illustrative aspect of a system 100 that is operable to generate physical unclonable function (PUF) output bits based on magnetic tunnel junction (MTJ) resistances is shown. In a particular aspect, the system 100 may correspond to a magnetic random access memory (MRAM). The system 100 includes a comparison circuit 102, a first selection circuit 104, and a second selection circuit 106. All or a portion of the system 100 may be integrated into a processor.

The system 100 also includes a plurality of MTJ elements 108-112. For example, the system 100 includes a first MTJ element 108, a second MTJ element 110, and an Nth MTJ element 112. In a particular aspect, N may be any integer greater than one. For example, if N is equal to seven, the system 100 includes seven MTJ elements. Each MTJ element 108-112 may be coupled to a corresponding input terminal of the first selection circuit 104 and to a corresponding input terminal of the second selection circuit 106. For example, the first MTJ element 108 may be coupled to a first input terminal of the first selection circuit 104 and to a first input terminal of the second selection circuit 106, the second MTJ element 110 may be coupled to a second input terminal of the first selection circuit 104 and to a second input terminal of the second selection circuit 106, and the Nth MTJ element 112 may be coupled to the Nth input terminal of the first selection circuit 104 and to the Nth input terminal of the second selection circuit 106.

In a particular aspect, each MTJ element 108-112 may be programmed (e.g., initialized) to an identical state. For example, each MTJ element 108-112 may be programmed to a parallel state (representative of a logical "0" data value) or each MTJ element 108-112 may be programmed to an anti-parallel state (representative of a logical "1" data value). In the parallel state, a polarization of a reference layer of each MTJ element 108-112 and a polarization of a corresponding free layer of each MTJ element 108-112 has a similar orientation. In the anti-parallel state, the polarization of the reference layer of each MTJ element 108-112 and the polarization of the corresponding free layer of each MTJ element 108-112 has an opposite orientation. Each MTJ element 108-112 may have a relatively low resistance (e.g., approximately between 2000 ohms and 4000 ohms) in the parallel state, and each MTJ element 108-112 may have a relatively high resistance (e.g., approximately between 4000 ohms and 8000 ohms) in the anti-parallel state. The resistance variations for MTJ elements 108-112 having the same state may be based on a manufacturing process (e.g., physical size and chemical composition).

The selection circuits 104, 106 may be configured to selectively couple the MTJ elements 108-112 to the comparison circuit 102. For example, the first selection circuit 104 (e.g., a first multiplexer) may be responsive to a first selection signal 114. The first selection signal 114 may be a multi-bit signal that indicates a particular MTJ element 108-112 for the first selection circuit 104 to couple to the comparison circuit 102. To illustrate, if the first selection signal 114 indicates a first logical value (e.g., "0000"), the first selection circuit 104 may couple the first MTJ element 108 to the comparison circuit 102. If the first selection signal 114 indicates a second logical value (e.g., "0001"), the first selection circuit 104 may couple the second MTJ element 110 to the comparison circuit 102. In the above example, the first selection signal 114 is a four-bit signal and the first selection circuit 104 may selectively couple one of sixteen MTJ elements to the comparison circuit 102 based on the logic value of the first selection signal 114 (e.g., "0000"-"1111"). However, the first selection signal 114 may have a different size. As a non-limiting example, the first selection signal 114 may be a three-bit signal and the first selection circuit 104 may selectively couple one of eight MTJ elements to the comparison circuit 102 based on the logic value of the first selection signal 114 (e.g., "000"-"111").

In a similar manner, the second selection circuit 106 (e.g., a second multiplexer) may be responsive to a second selection signal 116. The second selection signal 116 may be a multi-bit signal that indicates a particular MTJ element 108-112 for the second selection circuit 106 to couple to the comparison circuit 102. To illustrate, if the second selection signal 116 indicates the first logical value (e.g., "0000"), the second selection circuit 106 may couple the first MTJ element 108 to the comparison circuit 102. If the second selection signal 116 indicates the second logical value (e.g., "0001"), the second selection circuit 106 may couple the second MTJ element 110 to the comparison circuit 102. The first selection signal 114 and the second selection signal 116 may have different values such that each selection circuit 104, 106 couples a unique MTJ element 108-112 to the comparison circuit 102 at a given time.

The comparison circuit 102 (e.g., a differential comparison circuit) may be configured to compare a resistance of an MTJ element coupled to the comparison circuit 102 via the first selection circuit 104 (e.g., a resistance of an MTJ element selected by the first selection circuit 104) to a resistance of an MTJ element coupled to the comparison circuit 102 via the second selection circuit 106 (e.g., a resistance of an MTJ element selected by the second selection circuit 106). For simplicity of illustration, the following example assumes that the first selection circuit 104 couples the first MTJ element 108 to the comparison circuit 102 and the second selection circuit 106 couples the Nth MTJ element 112 to the comparison circuit 102.

The comparison circuit 102 may be configured to compare a first resistance of the first MTJ element 108 to an Nth resistance of the Nth MTJ element 112. If the first MTJ element 108 and the Nth MTJ element 112 are programmed to an identical state, the resistance variation (based on manufacturing processes) between the first resistance and the Nth resistance may be relatively small. Based on the resistance variation, the comparison circuit 102 may generate a first PUF output bit 118. For example, the comparison circuit 102 may detect which MTJ element 108, 112 has a greater voltage potential (e.g., a greater resistance). If the first MTJ element 108 has the greater voltage potential, the comparison circuit 102 may generate a logical "0" data value as the first PUF output bit 118. If the Nth MTJ element 112 has the greater voltage potential, the comparison circuit 102 may generate a logical "1" data value as the first PUF output bit 118.

Although the above example assumed that the first selection circuit 104 couples the first MTJ element 108 to the comparison circuit 102 (based on the first selection signal 114) and the second selection circuit 106 couples the Nth MTJ element 112 to the comparison circuit 102 (based on the second selection signal 116), the logical values of the selection signals 114, 116 may be adjusted (by a processor) to generate additional PUF output bits 118 based on the selected MTJ elements 108-112. As a non-limiting example, the logical value of the first selection signal 114 may be adjusted such that the first selection circuit 104 couples the Nth MTJ element 112 to the comparison circuit, and the logical value of the second selection signal 116 may be adjusted such that the second selection circuit 106 couples the second MTJ element 110 to the comparison circuit 102. The comparison circuit 102 may operate in a substantially similar manner, as described above, to generate a second PUF output bit 118 based on a comparison of the Nth resistance of the Nth MTJ element 112 and a second resistance of the second MTJ element 110.

The system 100 of FIG. 1 may enable generation of multiple PUF output bits 118 by comparing "non-adjacent" MTJ elements. For example, the selection circuits 104, 106 may enable the comparison circuit 102 to generate multiple PUF output bits 118 based on resistances for MTJ elements that are selected based on the (adjustable) logical values of the selection signals 114, 116. Thus, more PUF output bits 118 may be generated (compared to an MRAM architecture that only compares adjacent MTJ elements) using the same number of MTJ elements. Generating a greater number of PUF output bits 118 may enable a more secure random key (e.g., product identifier) for different products (e.g., chips). For example, a product may be identified using the PUF output bits 118. Generating more PUF output bits 118 using the ability to compare "non-adjacent" MTJ elements may reduce the likelihood that two products have the same product identifier.

Figure 2:
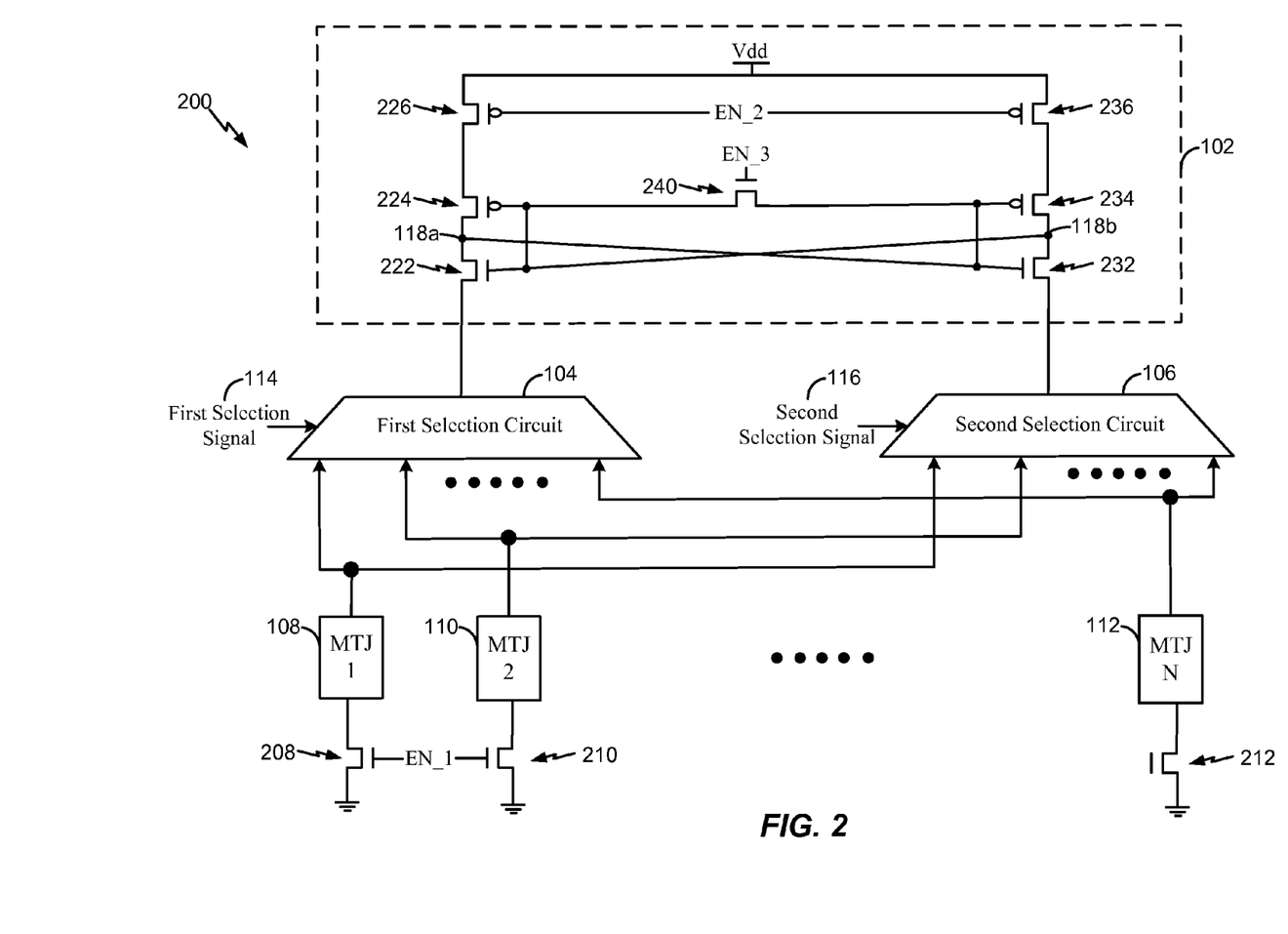
FIG. 2 is a diagram of another particular illustrative aspect of a system that is operable to generate PUF output bits based on MTJ resistances.

Referring to FIG. 2, another particular illustrative aspect of a system 200 that is operable to generate PUF output bits based on MTJ resistances is shown. In a particular aspect, the system 200 may correspond to an MRAM. The system 100 includes the comparison circuit 102, the first selection circuit 104, the second selection circuit 106, and the MTJ elements 108, 110, 112. In a particular aspect, all or a portion of the system 200 may be integrated into a processor.

Access transistors 208, 210, 212 may be coupled to the MTJ elements 108, 110, 112, respectively. For example, a first access transistor 208 may be coupled to the first MTJ element, a second access transistor 210 may be coupled to the second MTJ element 210, and an Nth access transistor 212 may be coupled to the Nth MTJ element. In a particular aspect, each access transistor 208-212 is an n-type metal oxide semiconductor (NMOS) transistor. A source of each access transistor 208-212 may be coupled to ground, and a drain of each access transistor 208-212 may be coupled to the respective MTJ element 108-112.

The comparison circuit 102 may include a transistor 222, a transistor 224, a transistor 226, a transistor 232, a transistor 234, a transistor 236, and a transistor 240. In a particular aspect, the transistors 222, 232, 240 are NMOS transistors and the transistors 224, 226, 234, 236 are p-type metal oxide semiconductor (PMOS) transistors. A source of the transistor 222 may be coupled to the output of the first selection circuit 104, and a source of the transistor 232 may be coupled to the output of the second selection circuit 106. A gate of the transistor 222 may be coupled to a drain of the transistor 232, and a gate of the transistor 232 may be coupled to a drain of the transistor 222.

A drain of the transistor 224 may be coupled to the drain of the transistor 222, and a source of the transistor 224 may be coupled to a source of the transistor 226. A drain of the transistor 234 may be coupled to the drain of the transistor 232, and a source of the transistor 234 may be coupled to a source of the transistor 236. Sources of the transistors 226, 236 may be coupled to receive a supply voltage (Vdd). A gate of the transistor 224 may be coupled to the gate of the transistor 222 and to a source of the transistor 240. A gate of the transistor 234 may be coupled to the gate of the transistor 232 and to a drain of the transistor 240.

A first enable signal (EN_1) having a logical high voltage level (e.g., a logical "1") may be provided to the gates of the access transistors 208-210 to enable current to flow through the MTJ elements 108-112, and a second enable signal (EN_2) having a logical low voltage level (e.g., a logical "0") may be provided to the gates of the transistors 226, 236 to enable current to flow through channels of the transistors 226, 236.

To begin sensing operations (e.g., comparison operations as described with respect to FIG. 1), a third enable signal (EN_3) provided to a gate of the transistor 240 may transition from the logical high voltage level to the logical low voltage level. For example, when the third enable signal (EN_3) transitions to the logical low voltage level, the gates of the transistors 224, 234 are "decoupled" from one another and the transistors 222, 224, 232, 234 operate as a pair of cross-coupled inverters.

If the MTJ element selected by the first selection circuit 104 has a higher resistance than the MTJ element selected by the second selection circuit 106, a first output 118a may have a logical high voltage level and a second output 118b may have a logical low voltage level. For example, the voltage applied to the drain of the transistor 222 may be relatively high compared to the voltage applied to the drain of the transistor 232, which may cause carriers to flow at the transistor 232 at a higher rate than at the transistor 222 (e.g., cause the transistor 232 to "pull down" the voltage at the second output 118b at a higher rate than the transistor 222 pulls down the voltage at the first output 118a).

If the MTJ element selected by the second selection circuit 106 has a higher resistance than the MTJ element selected by the first selection circuit 104, the second output 118b may have a logical high voltage level and the first output 118a may have a logical low voltage level. For example, the voltage applied to the drain of the transistor 232 may be relatively high compared to the voltage applied to the drain of the transistor 222, which may cause carriers to flow at the transistor 222 at a higher rate than at the transistor 232 (e.g., cause the transistor 222 to "pull down" the voltage at the first output 118a at a higher rate than the transistor 232 pulls down the voltage at the second output 118b). The outputs 118a, 118b may correspond to the PUF output bits 118 of FIG. 1. For example, if the first output 118a has a logical high voltage level (and the second output 118b has a logical low voltage level), the corresponding PUF output bit 118 may be a logical "1." If the first output 118a has a logical low voltage level (and the second output 118b has a logical high voltage level), the corresponding PUF output bit 118 may be a logical "0."

The system 200 of FIG. 2 may enable generation of multiple PUF output bits 118 by comparing "non-adjacent" MTJ elements. For example, the selection circuits 104, 106 may enable the comparison circuit 102 to generate multiple PUF output bits 118 based on resistances for MTJ elements that are selected based on the (adjustable) logical values of the selection signals 114, 116. Thus, more PUF output bits 118 may be generated (compared to an MRAM architecture that only compares adjacent MTJ elements) using the same number of MTJ elements.

Figure 3:
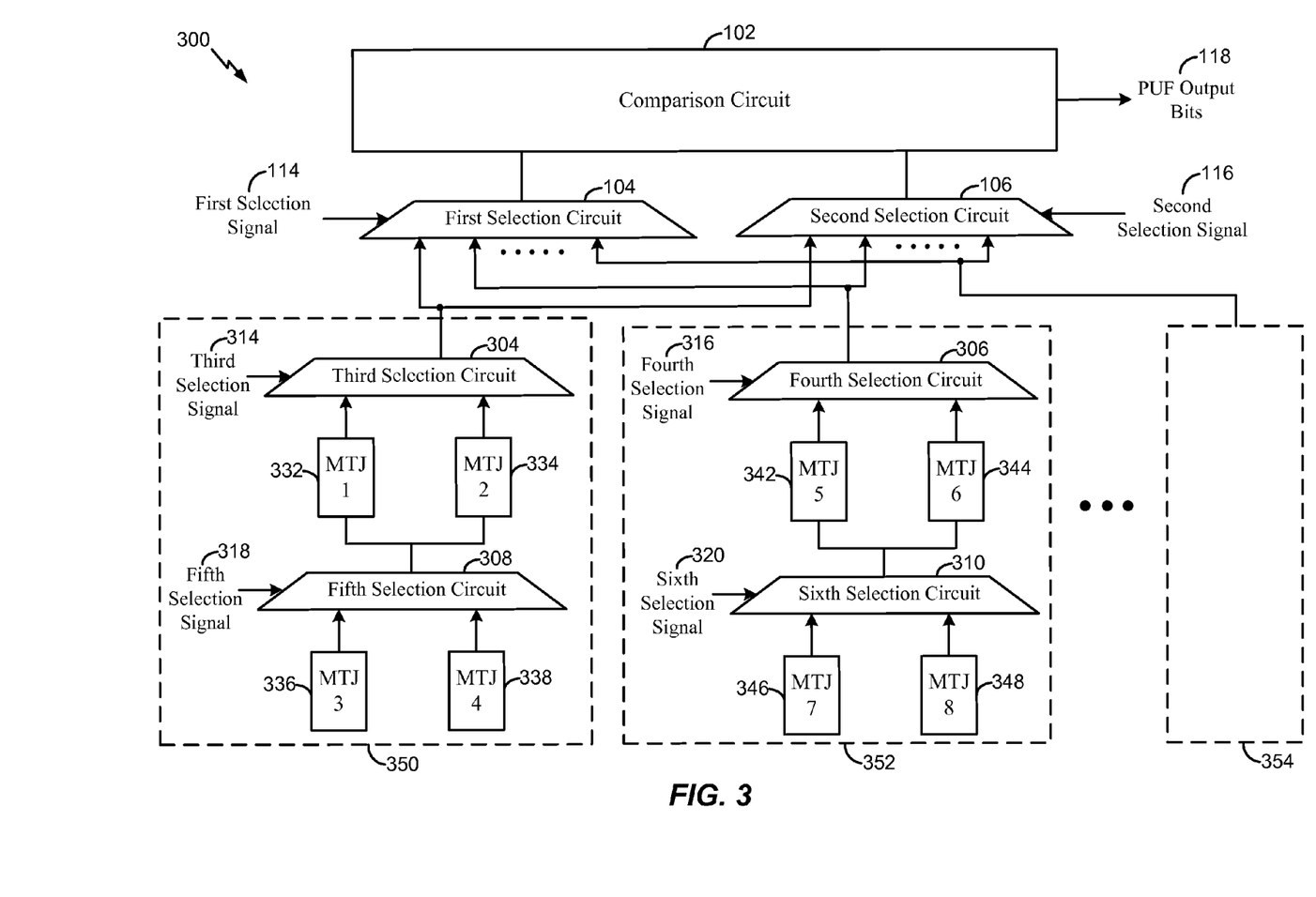
FIG. 3 is a diagram of another particular illustrative aspect of a system that is operable to generate PUF output bits based on MTJ resistances.

Referring to FIG. 3, another particular illustrative aspect of a system 300 that is operable to generate PUF output bits based on MTJ resistances is shown. In a particular aspect, the system 300 may correspond to an MRAM. The system 300 includes the comparison circuit 102, the first selection circuit 104, the second selection circuit 106, first MTJ circuitry 350, second MTJ circuitry 352, and Nth MTJ circuitry 354. In a particular aspect, all or a portion of the system 300 may be integrated into a processor.

The first MTJ circuitry 350 includes a third selection circuit 304, a fifth selection circuit 308, a first MTJ element 332, a second MTJ element 334, a third MTJ element 336, and a fourth MTJ element 338. The first MTJ element 332 may be coupled to a first input terminal of the third selection circuit 304, and the second MTJ element 334 may be coupled to a second input terminal of the third selection circuit 304. An output terminal of the third selection circuit 304 may be coupled to the first input terminal of the first selection circuit 104 and to the first input terminal of the second selection circuit 106. The third MTJ element 336 may be coupled to a first input terminal of the fifth selection circuit 308, and the fourth MTJ element 338 may be coupled to a second input terminal of the fifth selection circuit 308. An output terminal of the fifth selection circuit 308 may be coupled to the first MTJ element 332 and to the second MTJ element 334.

The third selection circuit 304 (e.g., a third multiplexer) may be responsive to a third selection signal 314, and the fifth selection circuit 308 may be responsive to a fifth selection signal 318. The selection signals 314, 318 may be multi-bit signals that indicate particular MTJ elements 332-338 to be coupled to respective outputs. To illustrate, if the third selection signal 314 indicates a first logical value (e.g., "0"), the third selection circuit 304 may couple the first MTJ element 332 to the output of the third selection circuit 304. If the third selection signal 314 indicates a second logical value (e.g., "1"), the third selection circuit 304 may couple the second MTJ element 334 to the output of the third selection circuit 304. In a similar manner, if the fifth selection signal 318 indicates the first logical value, the fifth selection circuit 308 may couple the third MTJ element 336 to the output of the fifth selection circuit 308. If the fifth selection signal 318 indicates the second logical value, the fifth selection circuit 308 may couple the fourth MTJ element 338 to the output of the fifth selection circuit 308.

The second MTJ circuitry 352 includes a fourth selection circuit 306, a sixth selection circuit 310, a fifth MTJ element 342, a sixth MTJ element 344, a seventh MTJ element 346, and an eighth MTJ element 348. The fifth MTJ element 342 may be coupled to a first input terminal of the fourth selection circuit 306, and the sixth MTJ element 344 may be coupled to a second input terminal of the fourth selection circuit 306. An output terminal of the fourth selection circuit 306 may be coupled to the second input terminal of the first selection circuit 104 and to the second input terminal of the second selection circuit 106. The seventh MTJ element 346 may be coupled to a first input terminal of the sixth selection circuit 310, and the eighth MTJ element 348 may be coupled to a second input terminal of the sixth selection circuit 310. An output terminal of the sixth selection circuit 310 may be coupled to the fifth MTJ element 342 and to the sixth MTJ element 344.

The fourth selection circuit 306 (e.g., a fourth multiplexer) may be responsive to a fourth selection signal 316, and the sixth selection circuit 310 may be responsive to a sixth selection signal 320. The selection signals 316, 320 may be multi-bit signals that indicate particular MTJ elements 342-348 to be coupled to respective outputs. To illustrate, if the fourth selection signal 316 indicates a first logical value (e.g., "0"), the fourth selection circuit 306 may couple the fifth MTJ element 342 to the output of the fourth selection circuit 306. If the fourth selection signal 316 indicates a second logical value (e.g., "1"), the fourth selection circuit 306 may couple the sixth MTJ element 344 to the output of the fourth selection circuit 306. In a similar manner, if the sixth selection signal 320 indicates the first logical value, the sixth selection circuit 310 may couple the seventh MTJ element 346 to the output of the sixth selection circuit 310. If the sixth selection signal 320 indicates the second logical value, the sixth selection circuit 310 may couple the eighth MTJ element 348 to the output of the sixth selection circuit 310.

The Nth MTJ circuitry 354 may include similar components as the first and second MTJ circuitry 350, 352 and may operate in a substantially similar manner. Selection circuitry within the Nth MTJ circuitry 354 may be coupled to the Nth input of the first selection circuit 104 and to the Nth input of the second selection circuit 106. The first and second selection circuits 104, 106 may be responsive to the first and second selection signals 114, 116, respectively, and may operate in a substantially similar manner as described with respect to FIGS. 1-2. However, instead of selectively coupling single MTJ elements to the comparison circuit 102, the first and second selection circuits 104, 106 may selectively couple the MTJ circuitries 350-354 to the comparison circuit 102.

During operation, MTJ elements may be selectively coupled in series to couple larger resistance values to the comparison circuit 102 for a more "stable" comparison operation. For example, resistance variations between the individual MTJ elements may be relatively small and difficult to detect at the comparison circuit 102. Coupling multiple MTJ elements in series may provide more resistance variation between the two inputs to the comparison circuit 102, which may yield a more accurate PUF output bit 118.

As a non-limiting example, the resistance of the first MTJ element 332 may be 4500 ohms and the resistance of the fifth MTJ element 342 may be 4515 ohms under normal temperature conditions (e.g., at approximately 25 degrees Celsius). If only the first MTJ element 332 and the fifth MTJ element are coupled to the comparison circuit 102, the comparison circuit 102 may generate a PUF output bit having a logical "0" value. However, under different temperature conditions (e.g., approximately 37 degrees Celsius), the resistance of the first MTJ element 332 may be 4490 ohms and the resistance of the fifth MTJ element 342 may fluctuate between 4489 ohms and 4492 ohms. Due to the fluctuation, the comparison circuit 102 may generate a PUF output bit 118 having a logical "1" value. Thus, inaccurate PUF output bits 118 may be generated based on changes in environmental conditions.

To circumvent these inaccurate PUF output bits 118, the selection circuits 104, 106, 314-320 may be operable to couple multiple MTJ elements to each input of the comparison circuit 102. As a non-limiting example, based on the selection signals 114, 314, 318, the first and the fourth MTJ elements 332, 338 may be coupled to the first input of the comparison circuit 102. Additionally, based on the selection signals 116, 316, 320, the fifth and the eighth MTJ elements 342, 348 may be coupled to the second input of the comparison circuit 102.

For illustrative purposes, the resistance of the fourth MTJ element 338 may be 4522 ohms and the resistance of the eighth MTJ element 348 may be 4555 ohms under normal temperature conditions (e.g., at approximately 25 degrees Celsius). However, at approximately 37 degrees Celsius, the resistance of the fourth MTJ element 338 may be 4515 ohms and the resistance of the eighth MTJ element 348 may fluctuate between 4540 ohms and 4543 ohms. Because the first and fourth MTJ elements 332, 338 are serially coupled to the first input of the comparison circuit 102 via the selection circuits 104, 304, 308, the total resistance coupled to the first input of the comparison circuit 102 may be equal to the sum of the first resistance of the first MTJ element 332 and the fourth resistance of the fourth MTJ element 338 (e.g., approximately 9005 ohms at 37 degrees Celsius). In a similar manner, because the fifth and eighth MTJ elements 342, 348 are serially coupled to the second input of the comparison circuit 102 via the selection circuits 106, 306, 310, the total resistance coupled to the second input of the comparison circuit 102 may be equal to the sum of the fifth resistance of the fifth MTJ element 342 and the eighth resistance of the eighth MTJ element 348 (e.g., a resistance fluctuating between approximately 9029 ohms and 9035 ohms).

Thus the total resistance at the first input of the comparison circuit 102 may be lower than the total resistance at the second input of the comparison circuit 102 for normal temperature conditions and at increased temperature conditions, which may enable a stable comparison operation at the comparison circuit 102 at different operating conditions (e.g., yield more "stable" PUF output bit 118 generation at different operating conditions. It should be understood the above example is for illustrative purposes only and is not intended to be limiting. The resistance values for each MTJ element 332-338, 342-348 may vary. Additionally, the MTJ elements 332-338, 342-348 and/or the MTJ circuitries 350-354 coupled to the comparison circuit 102 may vary based on the selection signals 114, 116, 314-320. Although each MTJ circuitry 350-354 is shown to have a two-stage selection, in other aspects, the MTJ circuitries 350-354 may include additional selection stages.

The system 300 of FIG. 3 may provide more accurate PUF output bit 118 generation over varying operating conditions. For example, coupling multiple MTJ elements in series may increase the difference between the resistance coupled to the first input of the comparison circuit 102 and the resistance coupled to the second input of the comparison circuit 102. For different operating conditions (e.g., different temperatures), although individual resistances for the MTJ elements may fluctuate, the "comparative" resistance values (e.g., whether a total resistance is "higher" or "lower") at the inputs of the comparison circuit 102 may remain stable. The stability of the comparative resistance values may enable more stable PUF output bits 118 at different operating conditions.

Figure 4:
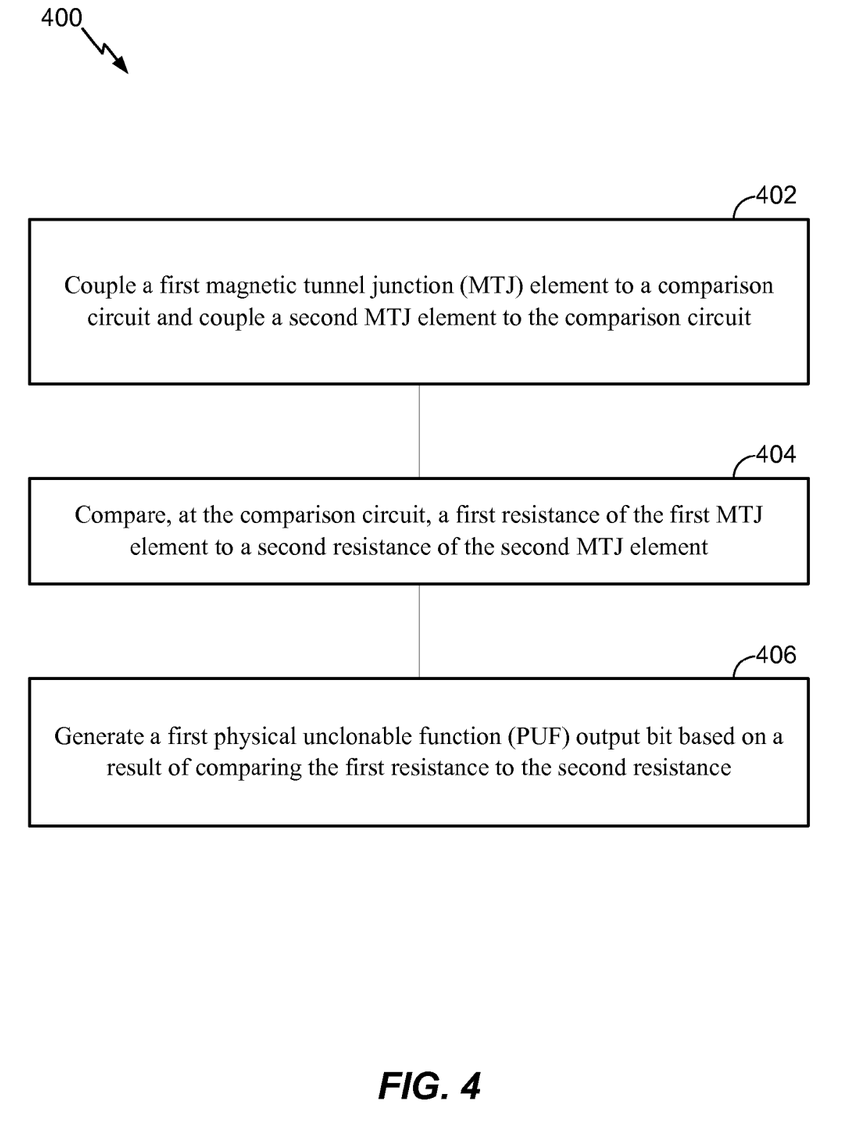
FIG. 4 is a flowchart of a particular illustrative aspect of a method for generating PUF output bits based on MTJ resistances.

Referring to FIG. 4, a flowchart that illustrates a method 400 for generating PUF output bits based on MTJ resistances is shown. The method 400 may be performed at the system 100 of FIG. 1, system 200 of FIG. 2, the system 300 of FIG. 3, or any combination thereof.

The method 400 includes coupling a first magnetic tunnel junction (MTJ) element to a comparison circuit and coupling a second MTJ element to the comparison circuit, at 402. For example, referring to FIG. 1, the first selection circuit 104 may selectively couple the first MTJ element 108 to the comparison circuit 102 and the second selection circuit 106 may selectively couple the Nth MTJ element 112 to the comparison circuit 102. In a particular aspect, the first MTJ element 108 and the Nth MTJ element 112 may be non-adjacent MTJ elements. For example, the first MTJ element 108 and the Nth MTJ element 112 may be located in non-adjacent rows and non-adjacent columns of a memory array. The first MTJ element 108 and the Nth MTJ element 112 may be programmed to an identical state (e.g., a parallel state or an anti-parallel state) by a processor.

A first resistance of the first MTJ element may be compared to a second resistance of the second MTJ element, at 404. For example, referring to FIG. 1, the comparison circuit may compare the first resistance of the first MTJ element 108 to the Nth resistance of the Nth MTJ element 112.

A first PUF output bit may be generated based on a result of comparing the first resistance to the second resistance. For example, referring to FIG. 1, if the first MTJ element 108 and the Nth MTJ element 112 are programmed to an identical state, the variation (based on manufacturing processes) between the first resistance and the Nth resistance may be relatively small. Based on the resistance variation, the comparison circuit 102 may generate the first PUF output bit 118. For example, the comparison circuit 102 may detect which MTJ element 108, 112 has a greater voltage potential (e.g., a greater resistance). If the first MTJ element 108 has the greater voltage potential, the comparison circuit 102 may generate a logical "0" data value as the first PUF output bit 118. If the Nth MTJ element 112 has the greater voltage potential, the comparison circuit 102 may generate a logical "1" data value as the first PUF output bit 118.

In a particular aspect, the method 400 may include selectively coupling the first MTJ element to the comparison circuit and selectively coupling a third MTJ element to the comparison circuit. The method 400 may also include comparing, at the comparison circuit, the first resistance of the first MTJ element to a third resistance of the third MTJ element. The method 400 may further include generating a second PUF output bit based on a result of comparing the first resistance to the third resistance.

In a particular aspect, the method 400 may include selectively coupling the second MTJ element to the comparison circuit and selectively coupling the third MTJ element to the comparison circuit. The method 400 may also include comparing, at the comparison circuit, the second resistance of the second MTJ element to the third resistance of the third MTJ element. The method 400 may further include generating a third PUF output bit based on a result of comparing the second resistance to the third resistance.

In a particular aspect, the method 400 includes selectively coupling a third MTJ element having a third resistance in series with the first MTJ element and selectively coupling a fourth MTJ element having a fourth resistance in series with the second MTJ element. The method 400 also includes comparing, at the comparison circuit, a first sum of the first resistance and third resistance to a second sum of the second resistance and the fourth resistance. The method 400 further includes generating a PUF output bit based on a result of comparing the first sum to the second sum.

The method 400 of FIG. 4 may enable generation of multiple PUF output bits 118 by comparing "non-adjacent" MTJ elements. For example, the selection circuits 104, 106 may enable the comparison circuit 102 to generate multiple PUF output bits 118 based on resistances for MTJ elements that are selected based on the (adjustable) logical values of the selection signals 114, 116. Thus, more PUF output bits 118 may be generated (compared to an MRAM architecture that only compares adjacent MTJ elements) using the same number of MTJ elements. Generating a greater number of PUF output bits 118 may enable a more secure random key (e.g., product identifier) for different products (e.g., chips). For example, a product may be identified using the PUF output bits 118. Generating more PUF output bits 118 using the ability to compare "non-adjacent" MTJ elements may reduce the likelihood that two products have the same product identifier. For example, the first PUF bit, the second PUF bit and the third PUF bit according to the method 400 may be used as product identifiers.

Figure 5:
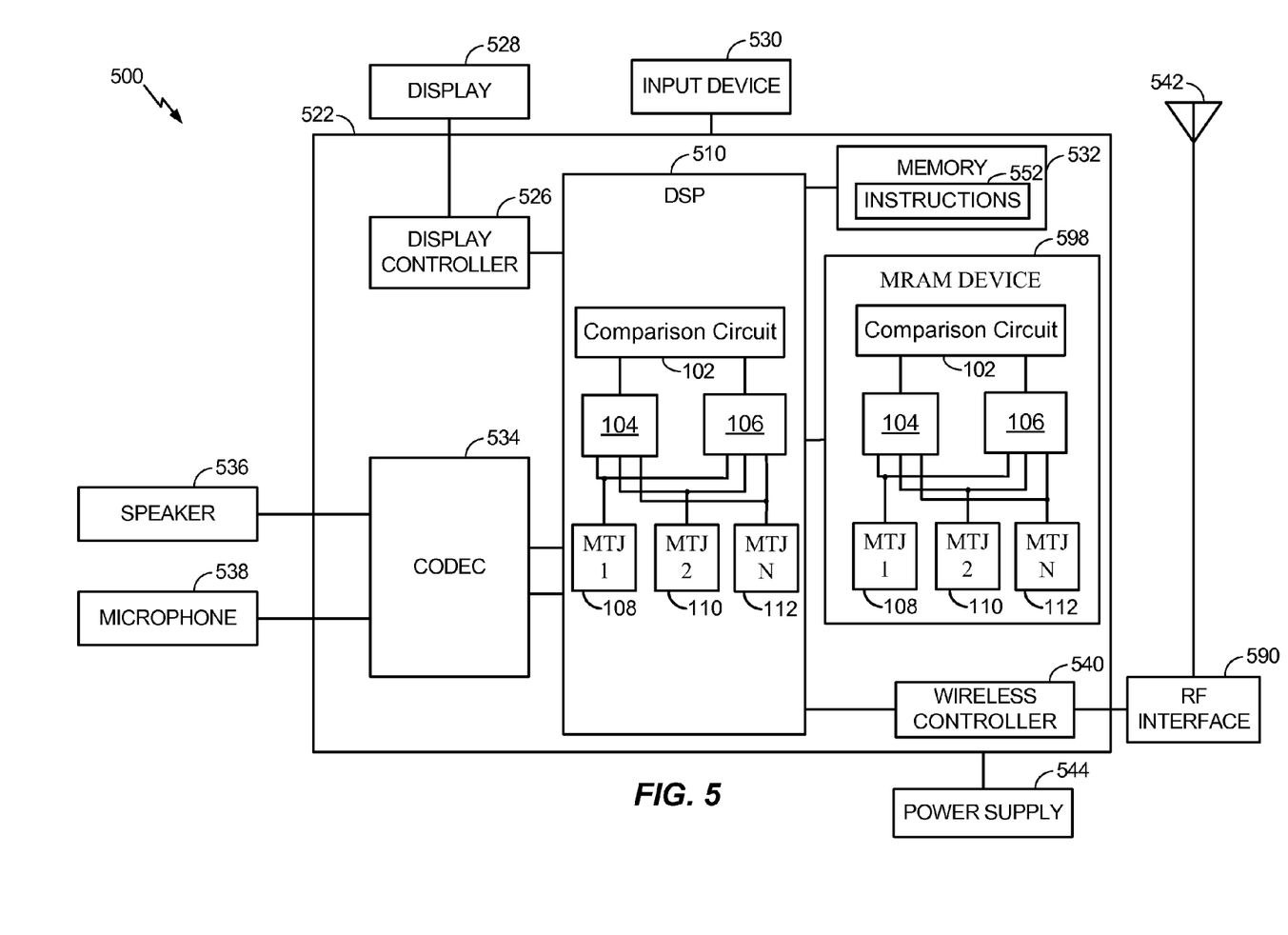
FIG. 5 is a block diagram of a wireless device including components operable to generate PUF output bits based on MTJ resistances.

Referring to FIG. 5, a block diagram of a wireless device 500 including components operable to generate PUF output bits based on MTJ resistances is shown. The wireless device 500 includes a processor 510, such as a digital signal processor (DSP), coupled to a memory 532.

The memory 532 may be a non-transitory processor-readable storage medium that includes instructions 552. In a particular aspect, the processor 510 may include the system 100 of FIG. 1, the system 200 of FIG. 2, the system 300 of FIG. 3 or any combination thereof. For example, the processor 510 may include the comparison circuit 102, the first selection circuit 104, the second selection circuit 106, and the MTJ elements 108-112. Components of the processor 510 may be configured to perform the method 400 of FIG. 4 by executing the instructions 552 stored in the memory 532. To illustrate, instructions 552 may be provided to the processor 510 that cause the processor 510 to generate a first selection signal and a second selection signal. The first selection signal may be provided to the first selection circuit 104 and may cause the first selection circuit 104 to couple the first MTJ element 108 to the comparison circuit 102. The second selection signal may be provided to the second selection circuit 106 and may cause the second selection circuit 106 to couple the second MTJ element 110 to the comparison circuit 102. Instructions may also be provided to the processor 510 that cause the comparison circuit 102 to compare the first resistance of the first MTJ element 108 to the second resistance of the second MTJ element 110 and to generate the first PUF output bit based on the comparison.

A MRAM device 598 may also be coupled to the processor 510. In a particular aspect, the MRAM device 598 may include the system 100 of FIG. 1, the system 200 of FIG. 2, the system 300 of FIG. 3 or any combination thereof. For example, the MRAM device 598 may include the comparison circuit 102, the first selection circuit 104, the second selection circuit 106, and the MTJ elements 108-112.

The wireless device 500 may also include a display controller 526 that is coupled to the processor 510 and to a display 528. A coder/decoder (CODEC) 534 can also be coupled to the processor 510. A speaker 536 and a microphone 538 can be coupled to the CODEC 534 and to the processor 510. FIG. 5 also indicates that a wireless controller 540 can be coupled to the processor 510. The wireless controller 540 may also be coupled to an antenna 542 via a radio frequency (RF) interface 590.

In a particular aspect, the processor 510, the display controller 526, the memory 532, the CODEC 534, and the wireless controller 540 are included in a system-in-package or system-on-chip device 522. In a particular aspect, an input device 530 and a power supply 544 are coupled to the system-on-chip device 522. Moreover, in a particular aspect, as illustrated in FIG. 5, the display 528, the input device 530, the speaker 536, the microphone 538, the antenna 542, and the power supply 544 are external to the system-on-chip device 522. However, each of the display 528, the input device 530, the speaker 536, the microphone 538, the antenna 542, and the power supply 544 can be coupled to a component of the system-on-chip device 522, such as an interface or a controller.

In conjunction with the described aspects, an apparatus includes means for selecting having a first input coupled to a first MTJ element and having a second input coupled to a second MTJ element. For example, the means for selecting may include the first selection circuit 104 of FIGS. 1-3 and 5, the processor 510 configured to execute the instructions 552 of FIG. 5, the MRAM device 598 of FIG. 5, or any combination thereof.

The apparatus may also include means for comparing a first resistance of the first MTJ element to a second resistance of the second MTJ element and for generating a first PUF output bit based on a result of comparing the first resistance to the second resistance. For example, the means for comparing may include the comparison circuit 102 of FIGS. 1-3 and 5, the processor 510 configured to execute the instructions 552 of FIG. 5, the MRAM device 598 of FIG. 5, or any combination thereof.

Those of skill would further appreciate that the various illustrative logical blocks, configurations, modules, circuits, and algorithm steps described in connection with the aspects disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD- ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:
coupling a first magnetic tunnel junction element and a second magnetic tunnel junction element of a plurality of magnetic tunnel junctions to a comparison circuit, wherein the first magnetic tunnel junction element and the second magnetic tunnel junction element are non-adjacent magnetic tunnel junction elements;
comparing, at the comparison circuit, a first resistance of the first magnetic tunnel junction element to a second resistance of the second magnetic tunnel junction element; and
generating a first physical unclonable function output bit based on a result of comparing the first resistance to the second resistance.

2. The method of claim 1, wherein the first magnetic tunnel junction element and the second magnetic tunnel junction element are located in non-adjacent rows or non-adjacent columns.

3. The method of claim 1, further comprising:
coupling a third magnetic tunnel junction element to the comparison circuit;
comparing, at the comparison circuit, the first resistance of the first magnetic tunnel junction element to a third resistance of the third magnetic tunnel junction element; and
generating a second physical unclonable function output bit based on a result of comparing the first resistance to the third resistance.

4. The method of claim 3, wherein the first magnetic tunnel junction element and the third magnetic tunnel junction element are non-adjacent magnetic tunnel junction elements.

5. The method of claim 1, wherein the first physical unclonable function output bit is used as a product identifier.

6. The method of claim 1, further comprising programming the first magnetic tunnel junction element and the second magnetic tunnel junction element to the same state prior to comparing the first resistance to the second resistance.

7. The method of claim 6, wherein the state is a parallel state or an anti-parallel state.

8. The method of claim 1, further comprising:
coupling a third magnetic tunnel junction element having a third resistance in series with the first magnetic tunnel junction element and coupling a fourth magnetic tunnel junction element having a fourth resistance in series with the second magnetic tunnel junction element;
comparing, at the comparison circuit, a first sum of the first resistance and the third resistance to a second sum of the second resistance and the fourth resistance; and
generating a second physical unclonable function output bit based on a result of comparing the first sum to the second sum.

9. An apparatus comprising:
a first selection circuit having a first input coupled to a first magnetic tunnel junction element of a plurality of magnetic tunnel junctions and having a second input coupled to a second magnetic tunnel junction element of the plurality of magnetic tunnel junctions, wherein the first magnetic tunnel junction element and the second magnetic tunnel junction element are non-adjacent magnetic tunnel junction elements;
a second selection circuit having a first input coupled to the first magnetic tunnel junction element and having a second input coupled to the second magnetic tunnel junction element;
a comparison circuit configured to:
compare a first resistance of the first magnetic tunnel junction element to a second resistance of the second magnetic tunnel junction element, wherein the first magnetic tunnel junction element is coupled to the comparison circuit via one of the first selection circuit or the second selection circuit, and wherein the second magnetic tunnel junction element is coupled to the comparison circuit via the other of the first selection circuit or the second selection circuit; and
generate a first physical unclonable function output bit based on a result of comparing the first resistance to the second resistance.

10. The apparatus of claim 9, wherein the first magnetic tunnel junction element and the second magnetic tunnel junction element are located in non-adjacent rows or non-adjacent columns.

11. The apparatus of claim 9, wherein the first selection circuit has a third input coupled to a third magnetic tunnel junction element, wherein the second selection circuit has a third input coupled to the third magnetic tunnel junction element, and wherein the comparison circuit is further configured to:
compare the first resistance of the first magnetic tunnel junction element to a third resistance of the third magnetic tunnel junction element, wherein the first magnetic tunnel junction element is coupled to the comparison circuit via one of the first selection circuit or the second selection circuit, and wherein the third magnetic tunnel junction element is coupled to the comparison circuit via the other of the first selection circuit or the second selection circuit; and
generate a second physical unclonable function output bit based on a result of comparing the first resistance to the third resistance.

12. The apparatus of claim 11, wherein the first magnetic tunnel junction element and the third magnetic tunnel junction element are non-adjacent magnetic tunnel junction elements.

13. The apparatus of claim 9, wherein the first physical unclonable function output bit is used as a product identifier.

14. The apparatus of claim 9, further comprising a processor configured to program the first magnetic tunnel junction element and the second magnetic tunnel junction element to an identical state.

15. The apparatus of claim 14, wherein the state is a parallel state or an anti-parallel state.

16. The apparatus of claim 9, further comprising:
a third selection circuit configured to couple a third magnetic tunnel junction element having a third resistance in series with the first magnetic tunnel junction element; and
a fourth selection circuit configured to couple a fourth magnetic tunnel junction element having a fourth resistance in series with the second magnetic tunnel junction element,
wherein the comparison circuit is further configured to:
compare a first sum of the first resistance and the third resistance to a second sum of the second resistance and the fourth resistance; and
generate a second physical unclonable function output bit based on a result of comparing the first sum to the second sum.

17. A non-transitory computer-readable medium comprising instructions that, when executed by a processor, cause the processor to:
couple a first magnetic tunnel junction element and a second magnetic tunnel junction element of a plurality of magnetic tunnel junctions to a comparison circuit, wherein the first magnetic tunnel junction element and the second magnetic tunnel junction element are non-adjacent magnetic tunnel junction elements;
compare, at the comparison circuit, a first resistance of the first magnetic tunnel junction element to a second resistance of the second magnetic tunnel junction element; and
generate a first physical unclonable function output bit based on a result of comparing the first resistance to the second resistance.

18. The non-transitory computer-readable medium of claim 17, wherein the first magnetic tunnel junction element and the second magnetic tunnel junction element are located in non-adjacent rows or non-adjacent columns.

19. The non-transitory computer-readable medium of claim 17, further comprising instructions that, when executed by the processor, cause the processor to:
couple a third magnetic tunnel junction element to the comparison circuit;
compare, at the comparison circuit, the first resistance of the first magnetic tunnel junction element to a third resistance of a third magnetic tunnel junction element; and
generate a second physical unclonable function output bit based on a result of comparing the first resistance to the third resistance.

20. The non-transitory computer-readable medium of claim 19, wherein the first magnetic tunnel junction element and the third magnetic tunnel junction MTJ element are non-adjacent magnetic tunnel junction elements.

21. The non-transitory computer-readable medium of claim 17, wherein the first physical unclonable function output bit is used as a product identifier.

22. The non-transitory computer-readable medium of claim 17, further comprising instructions that, when executed by the processor, cause the processor to program the first magnetic tunnel junction element and the second magnetic tunnel junction element to an identical state.

23. The non-transitory computer-readable medium of claim 22, wherein the state is a parallel state or an anti-parallel state.

24. The non-transitory computer-readable medium of claim 17, further comprising instructions that, when executed by the processor, cause the processor to:
couple a third magnetic tunnel junction element having a third resistance in series with the first magnetic tunnel junction element and couple a fourth magnetic tunnel junction element having a fourth resistance in series with the second magnetic tunnel junction element;
compare, at the comparison circuit, a first sum of the first resistance and the third resistance to a second sum of the second resistance and the fourth resistance; and
generate a second physical unclonable function output bit based on a result of comparing the first sum to the second sum.

25. An apparatus comprising:
means for selecting having a first input coupled to a first magnetic tunnel junction element and having a second input coupled to a second magnetic tunnel junction element of a plurality of magnetic tunnel junctions, wherein the first magnetic tunnel junction element and the second magnetic tunnel junction element are non-adjacent magnetic tunnel junction elements; and
means for comparing a first resistance of the first magnetic tunnel junction element to a second resistance of a second magnetic tunnel junction element and for generating a first physical unclonable function output bit based on a result of comparing the first resistance to the second resistance.

26. The apparatus of claim 25, wherein the first magnetic tunnel junction element and the second magnetic tunnel junction element are located in non-adjacent rows or non-adjacent columns.

27. The apparatus of claim 25, wherein the first physical unclonable function output bit is used as a product identifier.

28. The apparatus of claim 25, further comprising means for programming the first magnetic tunnel junction element and the second magnetic tunnel junction element to the same state prior to comparing the first resistance to the second resistance.

29. The apparatus of claim 28, wherein the state is a parallel state.

30. The apparatus of claim 28, wherein the state is an anti-parallel state.

* * * * *